United States Patent
Andersson et al.

(10) Patent No.: US 10,913,456 B2
(45) Date of Patent: Feb. 9, 2021

(54) METHOD AND SYSTEM FOR ADAPTIVE CRUISE CONTROL AND VEHICLE

(71) Applicant: SCANIA CV AB, Södertälje (SE)

(72) Inventors: Håkan Andersson, Ekolsund (SE); Sebastiaan Oremus, Södertälje (SE)

(73) Assignee: SCANIA CV AB (SE)

( * ) Notice: Subject to any disclaimer, the term of this patent is extended or adjusted under 35 U.S.C. 154(b) by 34 days.

(21) Appl. No.: 14/909,271

(22) PCT Filed: Aug. 27, 2014

(86) PCT No.: PCT/SE2014/050980
§ 371 (c)(1),
(2) Date: Feb. 1, 2016

(87) PCT Pub. No.: WO2015/034417
PCT Pub. Date: Mar. 12, 2015

(65) Prior Publication Data
US 2016/0176402 A1 Jun. 23, 2016

(30) Foreign Application Priority Data
Sep. 9, 2013 (SE) ...................................... 1351037

(51) Int. Cl.
*B60W 30/16* (2020.01)
(52) U.S. Cl.
CPC ....... *B60W 30/16* (2013.01); *B60W 2554/801* (2020.02); *B60W 2554/804* (2020.02);
(Continued)

(58) Field of Classification Search
None
See application file for complete search history.

(56) References Cited

U.S. PATENT DOCUMENTS

| 5,805,103 A | * | 9/1998 | Doi | ...................... G01S 13/931 342/70 |
| 6,044,321 A | * | 3/2000 | Nakamura | ......... B60K 31/0008 180/179 |

(Continued)

FOREIGN PATENT DOCUMENTS

| DE | 10 2012 012829 A1 | 1/2013 |
| WO | WO 2009/072965 | 6/2009 |

OTHER PUBLICATIONS

International Search Report dated Dec. 10, 2014 issued in corresponding International patent application No. PCT/SE2014/050980.

(Continued)

*Primary Examiner* — David P. Merlino
(74) *Attorney, Agent, or Firm* — Ostrolenk Faber LLP

(57) ABSTRACT

A method for adaptive cruise control of a host vehicle (2): A host vehicle (2) includes at least one acceleration device (8), at least one retardation device (10), a control unit (14) for acting upon the acceleration device (8) and the retardation device (10), a calculating unit (16) for determining at least one parameter related to a lead vehicle (6) and a distance sensor (12) for determining a distance from the host vehicle to the lead vehicle (6). The method includes the steps of: setting a first predetermined time distance between the host vehicle (2) and the lead vehicle (6), maintaining the first predetermined time distance, evaluating a parameter that characterizes velocity changes of the lead vehicle in order to optimize a time distance between the host vehicle (2) and the lead vehicle (6), changing the first predetermined time distance to a second predetermined time distance if the parameter that characterizes velocity changes reaches a threshold value, and maintaining the second predetermined time distance. A system, a vehicle, a computer program (Continued)

product and a computer program for the method are further described herein.

9 Claims, 2 Drawing Sheets

(52) U.S. Cl.
CPC ..... *B60W 2710/09* (2013.01); *B60W 2710/18* (2013.01); *B60W 2754/30* (2020.02)

(56) References Cited

U.S. PATENT DOCUMENTS

| | | | | |
|---|---|---|---|---|
| 6,256,574 B1* | 7/2001 | Prestl | .................... | B60W 30/16 701/96 |
| 6,304,811 B1* | 10/2001 | Prestl | ................. | B60K 31/0008 701/96 |
| 6,434,471 B1 | 8/2002 | Asada et al. | | |
| 9,269,264 B2* | 2/2016 | Shimizu | ................. | G08G 1/161 |
| 2002/0161506 A1* | 10/2002 | Ishizu | .................... | B60W 30/16 701/96 |
| 2006/0229793 A1* | 10/2006 | Sawamoto | ................ | B60T 7/22 701/96 |
| 2007/0272464 A1* | 11/2007 | Takae | .................... | B60W 30/16 180/169 |
| 2009/0138168 A1* | 5/2009 | Labuhn | ................. | B60W 30/17 701/93 |
| 2009/0157276 A1* | 6/2009 | Kade | .................... | B60W 30/16 701/96 |
| 2010/0023245 A1* | 1/2010 | Huang | ................. | B60W 30/12 701/117 |
| 2012/0176234 A1* | 7/2012 | Taneyhill | .............. | B60W 30/16 701/96 |
| 2012/0239268 A1 | 9/2012 | Chen et al. | | |
| 2013/0144502 A1* | 6/2013 | Shida | .................... | B60W 30/16 701/96 |
| 2013/0187771 A1* | 7/2013 | Rothschild | ........... | B60W 50/14 340/435 |
| 2015/0307099 A1* | 10/2015 | Dextreit | ................ | B60W 30/16 701/96 |
| 2015/0314790 A1* | 11/2015 | Deragarden | .......... | B60W 30/16 703/8 |
| 2016/0214608 A1* | 7/2016 | Packwood-Ace | ..... | B60W 30/16 |

OTHER PUBLICATIONS

International Preliminary Report on Patentability dated Dec. 4, 2015 issued in corresponding International patent application No. PCT/SE2014/050980.

* cited by examiner

METHOD AND SYSTEM FOR ADAPTIVE CRUISE CONTROL AND VEHICLE

CROSS-REFERENCE TO RELATED APPLICATIONS

The present application is a 35 U.S.C. §§ 371 national phase conversion of PCT/SE2014/050980, filed Aug. 27, 2014, which claims priority of Swedish Patent Application No. 1351037-5, filed Sep. 9, 2013, the contents of which are incorporated by reference herein. The PCT International Application was published in the English language.

TECHNICAL FIELD OF THE INVENTION

The present invention concerns a method for adaptive cruise control of a host vehicle. The present invention is further related to a system for adaptive cruise control of a host vehicle, a vehicle comprising a system for adaptive cruise control and a computer program product for adaptive cruise control of a host vehicle.

BACKGROUND

Modern vehicles are often equipped with cruise control (CC), i.e. a device by means of which a vehicle can be controlled so as to automatically maintain a set velocity. The cruise control affects only the acceleration device of the host vehicle, e.g. a throttle for an engine.

One advancement of the cruise control is a so-called ACC (Adaptive/Autonomous Cruise Control). Equipping the host vehicle with a distance sensor makes it possible to locate a lead vehicle and calculate certain parameters for the lead vehicle. The adaptive cruise control can utilize these parameters to control the host vehicle so that it maintains, for example, a constant time distance to the lead vehicle. In addition to being acted upon by the acceleration device of the host vehicle, the velocity of the host vehicle can also, if necessary, be reduced by means of a retardation device in the host vehicle, such as a wheel brake and/or auxiliary brake.

Adaptive cruise controls are known in which predetermined time windows between a host vehicle and a lead vehicle can be selected manually by a driver of the host vehicle.

US 2012/239268 describes a method for energy-saving control of a specific vehicle by means of adaptive cruise control. The method is particularly applicable to electric and hybrid vehicles, i.e. vehicles in which the charging status of the batteries must be taken into account. A total distance between a specific vehicle and a lead vehicle, the velocity of the lead vehicle and dynamic information about the specific vehicle are detected. A safe distance, an energy-saving buffer zone and a cruise control-activation zone are derived from the total distance between the specific vehicle and the lead vehicle, the velocity of the lead vehicle, and the dynamic information about the specific vehicle. According to the method, a decision is made as to whether the lead vehicle is entering the energy-saving buffer zone, and an energy-saving control measure is performed in that the specific vehicle is put into a trailing mode if the lead vehicle stops in the cruise control activation zone. The specific vehicle is controlled in a mode with constant velocity if the distance to the lead vehicle exceeds the total of the extents of the safe distance and the energy-saving buffer zone. Even when the specific vehicle is in trailing mode but the lead vehicle is accelerating/decelerating aggressively so that the total distance between the specific vehicle and the lead vehicle exceeds the total of the extents of the safe distance and the cruise control activation zone, the specific vehicle can abandon trailing mode and put itself into a mode with constant velocity.

WO 2009/072965 describes a method for supporting a regulating strategy for the driving of a vehicle. The properties of a target vehicle are intended to be determined. The distance values between the vehicle and the target vehicle are detected and the acceleration values are determined from said distance values. The acceleration values are processed so as to obtain data that characterize the target vehicle. These data that characterize the target vehicle are subsequently emitted to regulate the driving of the vehicle.

US 2012/176234 describes an adaptive cruise control by means of which a distance for the brake reaction time of a host vehicle is adjusted. A plurality of parameters is monitored. If one or more of the monitored parameters exceeds a predefined threshold value, at least one of the distance for the brake reaction time and the form of a limit is adjusted so as to follow a lead vehicle. Adjustments can be predefined depending on the type and/or magnitude of the triggered event. Monitored triggering parameters can include unfavorable weather, hazardous road, terrain or topography, dense traffic, erratic behavior by a lead vehicle and the like.

The need exists for an improved adaptive cruise control that enables fuel-saving driving of a host vehicle.

SUMMARY

One object of the present invention is to provide a method for fuel-saving adaptive cruise control of a host vehicle.

According to one aspect of the invention, this object is achieved by means of a method for adaptive cruise control of a host vehicle, which host vehicle comprises at least one acceleration device, at least one retardation device, one control unit for acting upon the acceleration device and the retardation device, one calculating unit for determining at least one parameter related to a lead vehicle, and one distance sensor for determining a distance to a lead vehicle. The method comprises the steps of:

setting a first predetermined time distance between the host vehicle and the lead vehicle in the control unit, maintaining the first predetermined time distance by acting upon the acceleration device and the retardation device by means of the control unit, evaluating, in the calculating unit, a parameter that characterizes velocity changes of the lead vehicle while maintaining the first predetermined time distance in order to optimize a time distance between the host vehicle and the lead vehicle, changing the first predetermined time distance to a second predetermined time distance between the host vehicle and the lead vehicle in the control unit if the parameter that characterizes velocity changes reaches a threshold value, and maintaining the second predetermined time distance by acting upon the acceleration device and the retardation device by means of the control unit.

Because the first predetermined time distance is changed to the second predetermined time distance if the parameter that characterizes velocity changes evaluated while maintaining the first predetermined time deviates from a threshold value, the distance between the host vehicle and the lead vehicle is adapted in dependence upon velocity changes of the lead vehicle. The adaptive cruise control of the host vehicle is thus adapted so that velocity changes of the lead vehicle are utilized so as to achieve more fuel-saving cruise control of the host vehicle than if said distance were not adapted. For example, the distance between the host vehicle and the lead vehicle can be increased if the lead vehicle is not maintaining a uniform velocity, or said distance can be decreased if the lead vehicle is maintaining a uniform velocity. The aforementioned object is achieved as a result.

The inventors have perceived that evaluating a parameter that characterizes velocity changes of a lead vehicle makes it possible to adapt an adaptive cruise control of a host vehicle for the purpose of saving fuel.

The present invention offers advantages from a safety standpoint as well. According to the method, the distance to a lead vehicle that is not maintaining a uniform velocity will be increased, which yields a greater safety margin to the lead vehicle.

The parameter that characterizes the lead vehicle can pertain directly to the lead vehicle or indirectly to the lead vehicle. In the latter case, while maintaining the first predetermined time distance, the host vehicle will be subject to velocity changes if the lead vehicle changes velocity. Velocity changes of the host vehicle can then constitute a parameter that represents velocity changes of the lead vehicle.

The host vehicle can be a vehicle propelled by a combustion engine or a vehicle with hybrid operation comprising a combustion engine. For example, the host vehicle can be a goods vehicle, but the invention can also be applicable to a car or a bus. The acceleration device of the host vehicle can comprise a throttle for a combustion engine. The retardation device of the host vehicle can consist of a number of different brake systems, such as wheel brakes, exhaust brakes, retarders and other types of auxiliary brakes, as well as an electric generator. The electrical generator can be arranged so as to charge batteries in a hybrid vehicle.

A change in the predetermined time distance can occur automatically by means of the control unit or be made manually by the driver of the host vehicle. In the first case, the control unit can automatically change the first predetermined time distance to the second predetermined time distance. In the second case the control unit can propose, e.g. via a display, to the driver that he change the first time-determined time distance to the second time-determined time distance, whereupon the driver must actively instruct the control unit to change the first time-determined time distance to the second time-determined time distance, e.g. by acting upon a control element.

The first and second predetermined time distance can consist of time distances that are predetermined or adjustable in the control unit. More than two predetermined time distances can exist. The control unit is arranged so as to manage the adaptive cruise control by acting upon the acceleration device and the retardation device. The calculating unit can, for example, determine the velocity of the host vehicle. The calculating unit can, for example, determine the velocity of a lead vehicle with the help of the distance sensor and the velocity of the host vehicle. The calculating unit can, for example, determine a velocity difference between the host vehicle and the lead vehicle. The control unit and the calculating unit can be physically separate units, or be implemented in the same physical unit. The control unit and/or the calculating unit can be realized in software.

According to embodiments of the step, changing the first predetermined time distance to the second predetermined time distance can comprise:

increasing a time distance between the host vehicle and the lead vehicle in the control unit if the parameter that characterizes velocity changes is above a first threshold so that the second predetermined time distance is longer than the first predetermined time distance. Increasing the time distance in connection with adaptive cruise control makes it possible to achieve a fuel-saving effect for the host vehicle when the lead vehicle is not maintaining a uniform velocity.

According to embodiments, when the second predetermined time distance is longer than the first predetermined time distance, the first and the second predetermined time distance can consist of a respective first time interval and a second time interval within which the host vehicle is considered to be maintaining the respective first and second predetermined time distances. The method can further comprise:

activating the retardation device by means of the control unit while maintaining the first predetermined time distance when a distance between the host vehicle and the lead vehicle has decreased to a predetermined portion of the first predetermined time distance, and activating the retardation device by means of the control unit while maintaining the second predetermined time distance when a distance between the host vehicle and the lead vehicle has decreased to a predetermined portion of the second predetermined time distance, whereupon the control unit activates the retardation device to a lesser degree while maintaining the second predetermined time distance than while maintaining the first predetermined time distance. Because the control unit in the host vehicle activates the retardation device to a lesser extent while maintaining the longer second predetermined time distance than while maintaining the shorter first predetermined time distance, a fuel-saving effect is achieved in the host vehicle in connection with adaptive cruise control thereof.

According to embodiments, the step of changing the first predetermined time distance to the second predetermined time distance can comprise:

reducing the time distance between the host vehicle and the lead vehicle in the control unit if the parameter that characterizes velocity changes is below a second threshold value, so that the second predetermined time distance is shorter than the first predetermined time distance. Reducing the distance to the lead vehicle when the lead vehicle is maintaining a uniform velocity thus enables the host vehicle to utilize more of the draft created by the lead vehicle. A fuel-saving effect can thus be achieved in the host value in connection with adaptive cruise control.

An additional aspect of the invention concerns a system for adaptive cruise control in a host vehicle comprising at least one acceleration device and at least one retardation device. The system comprises a control unit for acting upon the acceleration device and the retardation device, a calculating unit for determining at least one parameter related to a lead vehicle, and a distance sensor for determining a distance to a lead vehicle. The control unit is arranged so as to adjust a first predetermined time distance between the host vehicle and the lead vehicle, and so as to maintain the first predetermined time distance by acting upon the acceleration device and the retardation device. The calculating unit is arranged so as to evaluate a parameter that characterizes velocity changes of the lead vehicle while maintaining the first predetermined time distance in order to optimize a time distance between the host vehicle and the lead vehicle. The control unit is further arranged so as to change the first predetermined time distance to a second predetermined time distance between the host vehicle and the lead vehicle if the parameter that characterizes velocity changes reaches a threshold value, and to maintain the second predetermined time distance by acting upon the acceleration device and the retardation device.

An additional aspect of the invention concerns a vehicle comprising an acceleration device, a retardation device and a system for adaptive cruise control in accordance with the description herein.

An additional aspect of the invention concerns a computer program product for adaptive cruise control of a host vehicle, which host vehicle comprises at least one acceleration device and at least one retardation device, wherein the computer program product comprises program code arranged so as, when the program code is loaded into a computer, to cause the computer to:
set a first predetermined time distance between the host vehicle and a lead vehicle,
maintain said first predetermined time distance by acting upon the acceleration device and the retardation device,
evaluate a parameter that characterizes velocity changes of the lead vehicle while maintaining the first predetermined time distance in order to optimize a time distance between the host vehicle and the lead vehicle,
change the first predetermined time distance to a second predetermined time distance between the host vehicle and the lead vehicle if the parameter that characterizes velocity changes reaches a threshold value, and
maintain the second predetermined time distance by acting upon the acceleration device and the retardation device.

An additional aspect of the invention concerns a computer program for adaptive cruise control of a host vehicle, which host vehicle comprises at least one acceleration device and at least one retardation device, wherein the computer program is arranged so as to cause the computer to:
set a first predetermined time distance between the host vehicle and a lead vehicle,
maintain said first predetermined time distance by acting upon the acceleration device and the retardation device,
evaluate a parameter that characterizes velocity changes of the lead vehicle while maintaining the first predetermined time distance in order to optimize a time distance between the host vehicle and the lead vehicle,
change the first predetermined time distance to a second predetermined time distance between the host vehicle and the lead vehicle if the parameter that characterizes velocity changes reaches a threshold value, and
maintain the second predetermined time distance by acting upon the acceleration device and the retardation device.

The computer into which the program code can be loaded can consist of parts of a system described herein.

According to embodiments, the computer program can further be arranged so as to cause a computer to perform the method according to aspects and embodiments described herein.

Additional features and advantages of the present invention will become obvious upon examination of the accompanying claims and the following detailed description.

BRIEF DESCRIPTION OF DRAWINGS

Various aspects of the invention, including its particular features and advantages, will be understood from the exemplary embodiments, which are discussed in the following detailed description and accompanying drawings, in which.

DETAILED DESCRIPTION

Aspects of the present invention will now be described more completely. The same reference designations refer consistently herein to the same types of features. For the sake of simplicity and clarity, familiar functions and designs will not necessarily be described in detail herein.

Figure 1:
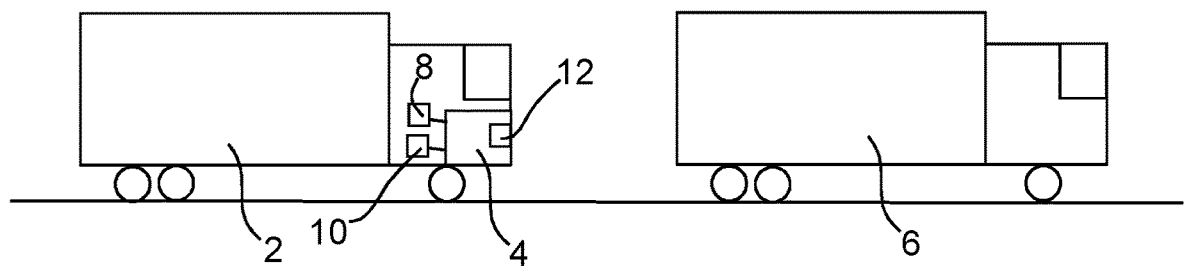
FIG. 1 shows an embodiment of a vehicle consisting of a host vehicle comprising a system for adaptive cruise control of the host vehicle.

FIG. 1 shows an embodiment of a vehicle consisting of a host vehicle 2 comprising a system 4 for adaptive cruise control of the host vehicle 2. In FIG. 1 the host vehicle 2 is being driven on a road behind a lead vehicle 6. The host vehicle 2 comprises at least one acceleration device 8 and at least one retardation device 10. The acceleration device 8 can comprise, for example, a throttle for a combustion engine of the host vehicle 2. Examples of retardation devices 10 include a wheel brake, an exhaust brake, a retarder and other types of auxiliary brakes and an electric generator for charging a battery, for example in a hybrid vehicle. The host vehicle 2 can be equipped with one or a plurality of the exemplary retardation devices. In the event that the host vehicle 2 is equipped with a plurality of retardation devices, they can be employed individually and separately, or simultaneously in a plurality. The system 4 comprises a distance sensor 12 for determining a distance to the lead vehicle 6.

Figure 2:
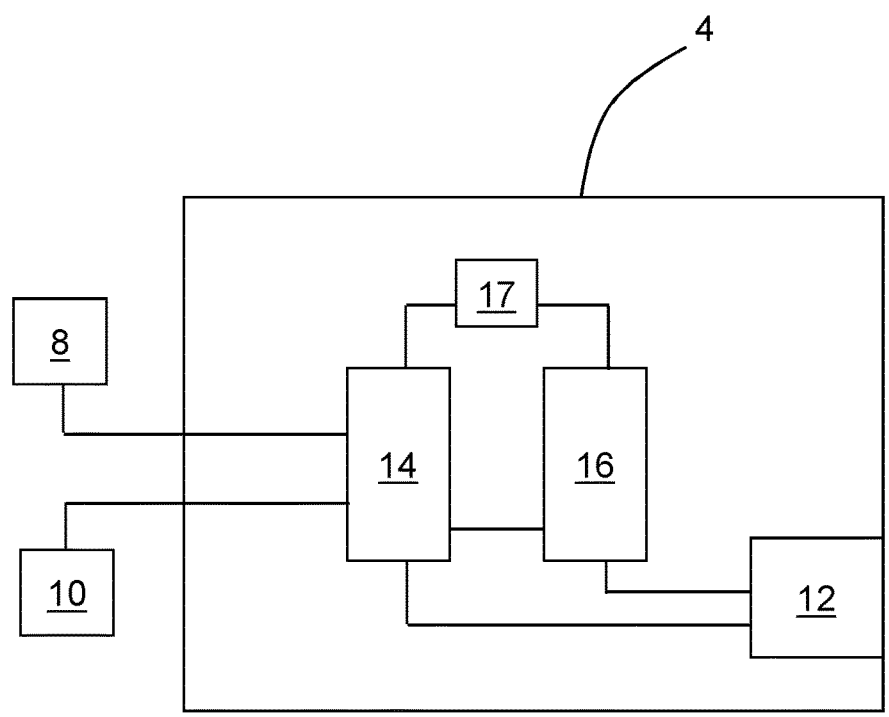
FIG. 2 shows the system for adaptive cruise control in FIG. 1 in greater detail.

FIG. 2 shows the system 4 for adaptive cruise control in FIG. 1 in greater detail. In addition to the distance sensor 12, the system 4 comprises a control unit 14 for acting upon the acceleration device 8 and the retardation device 10 of the host vehicle, and a calculating unit 16 for determining at least one parameter related to the lead vehicle. The system 4 suitably comprises a memory 17 for storing collected and calculated data such as parameters, velocity data, threshold values and limit values. The memory 17 is shown in FIG. 2 as a separate unit connected to the control unit 14 and the calculating unit 16. The memory 17 can alternatively be integrated into the control unit 14 and/or the calculating unit 16. The distance sensor 12 can comprise a camera and/or a radar and/or a laser distance-measuring device, which is/are connected to the calculating unit 16 and/or the control unit 14. The control unit 14 is connected to the calculating unit 16 so that data can be transferred between the control unit 14 and the calculating unit 16. Data transfer can also occur via the memory 17.

The system 4 is arranged for adaptive cruise control of the host vehicle 6 in a known way, i.e. in that the system 4 acts upon the acceleration device 8 and the retardation device 10 of the host vehicle 2 so that the host vehicle 6 maintains a constant time distance to the lead vehicle 6.

During adaptive cruise control, the control unit 14 acts upon the acceleration device 8 and the retardation device 10 so as to maintain a constant distance to the lead vehicle. The distance sensor 12 can supply the control unit 14 with the actual distance to the lead vehicle. The calculating unit 16 can supply the control unit 14 with other data, such as the velocity of the lead vehicle and/or the velocity difference between the host vehicle and the lead vehicle. The calculating unit 16 can calculate the velocity of the lead vehicle based on the distance to the lead vehicle obtained from the distance sensor 12 and information about the velocity of the host vehicle. The velocity of the host vehicle can be determined, for example, by a speedometer associated with the calculating unit 16, or determined by means of calculation in the calculating unit 16.

According to the invention, the control unit 14 is further arranged so as to set at least one first and one second predetermined time distance between the host vehicle and the lead vehicle, and so as to maintain said respective first and second predetermined time distances by acting upon the acceleration device 8 and the retardation device 10. The first and the second predetermined time distances thus consist of two different time distances that can be maintained during adaptive cruise control of the host vehicle. The first predetermined time distance suitably consists of a first time interval and the second predetermined time distance of a second time interval. When the host vehicle is within the respective first and the second time intervals, the host vehicle is considered to be maintaining said respective first and second predetermined time distances. A time distance is the time that elapses from when the lead vehicle passes a point until the host vehicle passes the same point. The time distance is appropriately measured in time, e.g. in seconds. However, the time distance can alternatively be measured in distance. In this case the distance that represents the time distance will vary with the velocity of the host vehicle and the lead vehicle.

The calculating unit 16 is further arranged so as to evaluate a parameter that characterizes velocity changes of the lead vehicle while maintaining the respective first and second predetermined time distances. The parameter is evaluated in order to optimize a time distance between the host vehicle and the lead vehicle. The time distance is optimized from a fuel-savings standpoint with respect to the host vehicle. The control unit 14 is namely further arranged so as to change the first predetermined time distance to a second predetermined time distance if the parameter that characterizes velocity changes reaches a threshold value. A threshold value thus indicates a limit for when the control unit is to change the first predetermined time distance to the second predetermined time distance.

According to embodiments, the control unit can be arranged so as to increase a time distance between the host vehicle and the lead vehicle if the parameter that characterizes velocity changes is above a first threshold value, so that the second predetermined time distance is longer than the first predetermined time distance.

According to embodiments, the control unit can be arranged so as to decrease a time distance between the host vehicle and the lead vehicle if the parameter that characterizes velocity changes is below a second threshold value, so that the second predetermined time distance is shorter than the first predetermined time distance.

According to embodiments, the control unit can be arranged so as to abandon a predetermined time distance between the host vehicle and the lead vehicle if the parameter that characterizes velocity changes is above a limit value. A limit value thus indicates a limit for when it is not economical from a fuel perspective for the host vehicle to follow the lead vehicle using adaptive cruise control. A limit value can alternatively indicate a limit for when it is inappropriate from a safety standpoint for the host vehicle to follow the lead vehicle using adaptive cruise control.

According to embodiments, the system can be arranged so as to perform a method according to aspects and embodiments described herein.

Figure 3:
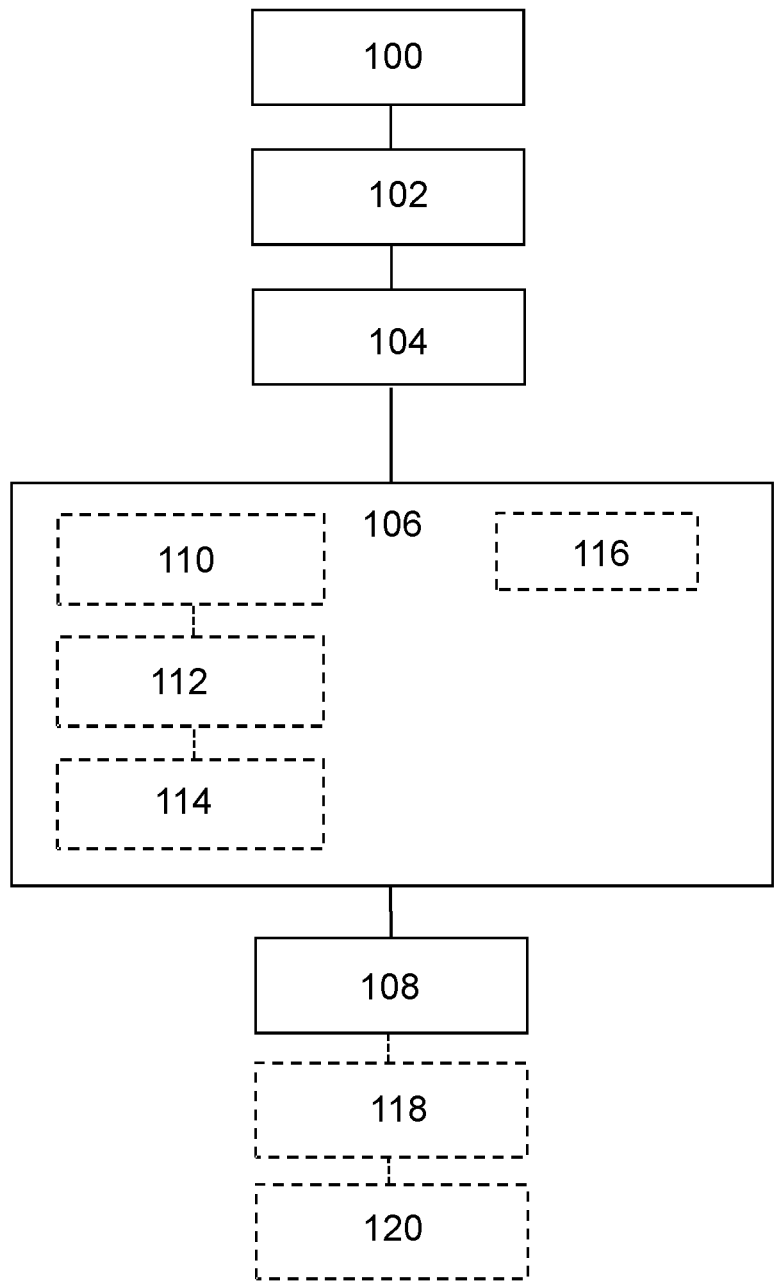
FIG. 3 shows embodiments of a method for adaptive cruise control of a host vehicle according to the embodiments described in FIGS. 1 and 2.

FIG. 3 shows embodiments of a method for adaptive cruise control of a host vehicle according to the embodiments described in connection with FIGS. 1 and 2. The method comprises the steps of:

setting 100 a first predetermined time distance between the host vehicle and the lead vehicle in the control unit, maintaining 102 the first predetermined time distance by acting upon the acceleration device and the retardation device by means of the control unit, evaluating 104, in the calculating unit, a parameter that characterizes velocity changes of the lead vehicle while maintaining the first predetermined time distance in order to optimize a time distance between the host vehicle and the lead vehicle, changing 106 the first predetermined time distance to a second predetermined time distance between the host vehicle and the lead vehicle in the control unit if the parameter that characterizes velocity changes reaches a threshold value, and maintaining 108 the second predetermined time distance by acting upon the acceleration device and the retardation device by means of the control unit.

The first predetermined time distance appropriately consists of a first time interval and the second predetermined time distance of a second time interval. When the host vehicle is within the respective first and second predetermined time intervals, the host vehicle is considered to be maintaining the respective first and second predetermined time distances.

The step of changing 106 the first predetermined time distance to the second predetermined time distance can comprise:

increasing 110 a time distance between the host vehicle and the lead vehicle in the control unit if the parameter that characterizes velocity changes is above a first threshold value, so that the second predetermined time distance is longer than the first predetermined time distance.

The method can further comprise:

activating 112 the retardation device by means of the control unit while maintaining the first predetermined time distance when a distance between the host vehicle and the lead vehicle has decreased to a predetermined portion of the first predetermined time distance, and activating 114 the retardation device by means of the control unit while maintaining the second predetermined time distance when a distance between the host vehicle and the lead vehicle has decreased to a predetermined portion of the second predetermined time distance. The control unit thus activates the retardation device to a lesser degree when maintaining the second predetermined time distance than when maintaining the first time distance. The host vehicle thus maintains a more uniform velocity when maintaining the second predetermined time distance than when maintaining the first predetermined time distance, which leads to economical driving of the host vehicle under adaptive cruise control. For example, the predetermined portion of the first and second time distance can consist of 80% of the respective time distance.

If the lead vehicle is being driven in a manner that the calculating unit considers to be economical from a fuel standpoint, the step of changing 106 the first predetermined time distance to the second predetermined time distance can instead comprise:

decreasing 116 a time distance between the host vehicle and the lead vehicle in the control unit if the parameter that characterizes velocity changes is below a second threshold value, so that the second predetermined time distance is shorter than the first predetermined time distance. In other words, if the parameter that characterizes velocity changes is below a second threshold value, the lead vehicle is considered as being driven in a fuel-economical manner. Adaptive cruise control with a shorter time distance to the lead vehicle then enables the utilization of a greater portion of the draft from the lead vehicle.

The method can, of course, include more predetermined time distances than the first and the second time distances. Time distances between the host vehicle and the lead vehicle can thus be increased in one or more additional steps in order to achieve fuel-economical adaptive cruise control. Time distances between the host vehicle and the lead vehicle can be correspondingly decreased in one or more additional steps in order to achieve fuel-economical adaptive cruise control. In order not to surprise the driver of the host vehicle, only the shortest predetermined time distance(s) are manually selectable by the driver in connection with automatic changing of the predetermined time intervals in the control unit.

The method can further comprise the steps of:

continuing to evaluate 118 a parameter that characterizes velocity changes of the lead vehicle in the calculating unit, and abandoning 120 a predetermined time distance between the host vehicle and the lead vehicle if the parameter that characterizes velocity changes is above a limit value. A limit value has been set in the calculating unit or the control unit that is above the first threshold value. If this limit value is exceeded, it means that lead vehicle is being driven in such an uneconomical manner that it is not economical from a fuel standpoint to maintain a predetermined time distance, e.g. the first or second predetermined time distance, i.e. it is appropriate to discontinue the adaptive cruise control. The host vehicle can subsequently transition to non-adaptive cruise control or manual cruise control by the driver of the host vehicle.

Various examples of the parameter that characterizes velocity changes of the lead vehicle will be provided below. These exemplary parameters are applicable in both the system 4 for adaptive cruise control and the method for adaptive cruise control. Certain of the parameters are exemplified individually, but the parameters can of course be used in combination with one another.

According to embodiments, the parameter that characterizes velocity changes can be related to a magnitude of the deviation of the lead vehicle from an average velocity of the lead vehicle. For example, the first threshold value can be set at a deviation of 7% from the average velocity of the lead vehicle, at which deviation the system or method increases from the first predetermined time distance to the second predetermined time distance, which constitutes a longer time distance than the first predetermined time distance. Furthermore, the second threshold value can be set, for example, at a deviation of the average velocity of the lead vehicle, at which deviation the system or method decreases the first predetermined time distance to the second predetermined time distance, which in this case constitutes a shorter time distance than the first predetermined time distance. Moreover, the limit value can be set, for example, at a deviation of 10% from the average velocity of the lead vehicle, at which deviation the system or method abandons a predetermined time distance to the lead vehicle.

According to embodiments, the parameter that characterizes velocity changes can be related to a magnitude of the standard deviation of the lead vehicle from the average velocity of the lead vehicle.

The standard deviation of the lead vehicle from its average velocity can be defined as follows:

$$\sigma = \sqrt{\frac{\sum_{i=1}^{N}(x_i - \mu)}{N}}, \text{ with } \mu = \frac{1}{N}\sum_{1}^{N} x_i$$

where $\sigma$ is the standard deviation, N the number of measurement points and $x_i$ a measurement point i.

For example, the first threshold value can be set at a standard deviation $\sigma=2$ km/h from the average velocity of the lead vehicle, at which standard deviation the system or method increases from the first predetermined time distance to the second predetermined time distance, which is a longer time distance than the first predetermined time distance. In addition, the second threshold value can, for example, be set at a standard deviation $\sigma=1$ km/h from the average velocity of the lead vehicle, at which standard deviation the system or decreases the first predetermined time distance to the second predetermined time distance, which in this case is a shorter time distance than the first predetermined time distance. Furthermore, the limit value can, for example, be set to a standard deviation $\sigma=5$ km/h from the average velocity of the lead vehicle, at which standard deviation the system or method abandons a predetermined time distance to the lead vehicle.

According to embodiments, the parameter that characterizes velocity changes can be related to the number of deviations of the lead vehicle per unit of time from an average velocity of the lead vehicle. A deviation from the average velocity of the lead vehicle should suitably have a given magnitude that is counted as a deviation. For example, a deviation of at least 2% from the average velocity can be considered to constitute a deviation, whereupon, for example, the first threshold value can be set at 15 deviations per minute that the lead vehicle is making from its average velocity, at which number of deviations the system or method increases from the first predetermined time distance to the second predetermined time distance, which is a longer time distance than the first predetermined time distance. In addition, for example, the second threshold value can be set at 5 deviations per minute that the lead vehicle is making from its average velocity, at which number of deviations the system or method decreases the first predetermined time distance to the second predetermined time distance, which in this case is a shorter time distance than the first predetermined time distance. Furthermore, for example, the limit value can be set at 20 deviations per minute that the lead vehicle is making from its average velocity, at which number of deviations the system or method abandons a predetermined time distance to the lead vehicle.

According to embodiments, the parameter that characterizes velocity changes can be related to acceleration and/or retardation of the lead vehicle. If, for example, the number of accelerations and/or retardations of the lead vehicle exceeds certain threshold values, or if the magnitude of accelerations and/or retardations of the lead vehicle exceeds certain threshold values, the system or method can change the first predetermined time distance to the second predetermined time distance or, in relevant cases, abandon a predetermined time distance if a limit value is exceeded. According to embodiments, the parameter that characterizes velocity changes can be related to how the lead vehicle retards and accelerates while passing a hilltop. If the calculating unit or the control unit has access to data concerning the slope of the roadway on which the host vehicle and the lead vehicle are traveling, the parameter in the calculating unit can be set to, and constitute, a rating of how economically the lead vehicle is passing a hilltop. For example, a retardation of 1% at an average velocity of 80 km/h while passing a hilltop gives a good rating that leads to a decrease in the predetermined time distance, while a retardation of, for example, 9% or 10%, gives a poor rating that leads to an increase in the predetermined time distance.

According to embodiments, the parameter that characterizes velocity changes can be related to the type of vehicle that the lead vehicle is. If the calculating unit calculates a vehicle type, and the distance sensor provides information about the width and/or height of the lead vehicle or the control unit obtains information in some other way about what type of vehicle the lead vehicle is, this information can serve as a basis for changing the predetermined time distance. For example, information that the lead vehicle is a goods vehicle leads to a decrease in the predetermined time distance, while information that the lead vehicle is, for example, a car leads to an increase in the predetermined time distance.

According to embodiments, when the parameter is related to vehicle type, the parameter that characterizes velocity changes can also be related to the slope of the roadway on which the host vehicle and the lead vehicle are traveling. For example, information that the roadway slopes downhill beyond a certain degree and information that the lead vehicle is a car can, in connection with the use of a system for adaptive cruise control in a goods vehicle, lead to an increase in the predetermined time distance, since the car will not increase its velocity as much as the goods vehicle. If the roadway instead slopes uphill beyond a certain degree, the predetermined time distance can be maintained, as the car can be presumed to maintain its velocity better than the goods vehicle.

According to embodiments, the parameter that characterizes velocity changes can be related to the number of activations of the acceleration device and/or the retardation device per unit of time. In other words, the parameter that characterizes the lead vehicle is in this case indirectly related to the lead vehicle. Because the host vehicle maintains the first predetermined time distance and the control unit thereby acts upon the acceleration device and the retardation device, velocity changes of the lead vehicle will lead to activations of the acceleration device and/or the retardation device in the host vehicle, which activations will differ from, for example, activations according to a control algorithm that would be used in connection with non-adaptive cruise control. The number of activations per unit of time can thus be used to set the first threshold value, the second threshold value and the limit value.

Figure 4:
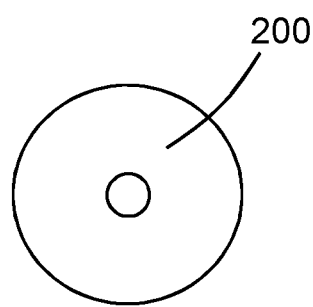
FIG. 4 shows a computer program product for adaptive cruise control of a host vehicle.

FIG. 4 shows a computer program product 200 for adaptive cruise control of a host vehicle, which host vehicle comprises at least one acceleration device and at least one retardation device, wherein the computer program product comprises program code arranged so as, when the program code is loaded into a computer, to cause the computer to:

set a first predetermined time distance between the host vehicle and a lead vehicle, maintain the first predetermined time distance by acting upon the acceleration device and the retardation device, evaluate a parameter that characterizes velocity changes of the lead vehicle while maintaining the first predetermined time distance in order to optimize a time distance between the host vehicle and the lead vehicle, change the first predetermined time distance to a second predetermined time distance between the host vehicle and the lead vehicle if the parameter that characterizes velocity changes reaches a threshold value, and maintain the second predetermined time distance by acting upon the acceleration device and the retardation device.

The computer into which the program code of the computer program product can be loaded can consist of parts of a system 4 described herein, e.g. a control unit 14, and/or a calculating unit 16 of the system 4 can include a computer.

The computer program product 200 is exemplified in the form of a computer-readable CD-ROM disk.

According to embodiments, the program code can further be arranged so as to cause, when the program code is loaded into a computer, the computer to perform the method according to aspects and embodiments described herein.

This invention is not to be interpreted as limited by the embodiments described herein. One skilled in the art will perceive that various features of the present invention can be combined to create embodiments other than those described herein without departing from the protective scope defined in the accompanying claims. One skilled in the art will also understand that when the parameter that characterizes velocity changes of the lead vehicle is above a threshold value or a limit value, it means that the lead vehicle is being driven at non-uniform velocity. This correspondingly entails that when the parameter that characterizes velocity changes of the lead vehicle is below a threshold value, it means that the lead vehicle is being driven at uniform velocity. Selecting or modifying a parameter that behaves in the opposite manner does not alter the basic idea of the invention, and such a modification is consequently considered to fall within the protective scope of the claims. It must consequently be understood that the foregoing is illustrative of various exemplary embodiments, and that the invention is defined solely by the accompanying claims.

The terms "comprise" and "comprising" are not limitative and encompass one or more features, elements, steps, components and functions but do not exclude the presence of one or more other features, elements, steps, components, functions or groups thereof.

The invention claimed is:

1. A method by an adaptive cruise control of a host vehicle with at least one acceleration device configured for accelerating the host vehicle, at least one retardation device configured for retarding the host vehicle, a control unit configured for acting upon the acceleration device and the retardation device, a calculating unit configured for determining at least one parameter related to a lead vehicle, and a distance sensor configured for determining a distance from the host vehicle to the lead vehicle, wherein the method comprises:

setting, by the control unit, without driver input, a first predetermined time distance between the host vehicle and the lead vehicle;

maintaining the first predetermined time distance by the control unit acting upon at least one of the at least one acceleration device and the at least one retardation device;

evaluating, in the calculating unit, a parameter, that includes one of: (1) a number of velocity deviations, above a threshold deviation value, per unit of time, of the lead vehicle from an average velocity of the lead vehicle; (2) a magnitude of a deviation of a velocity of the lead vehicle from the average velocity of the lead vehicle; and (3) a magnitude of a standard deviation of velocity of the lead vehicle from the average velocity of the lead vehicle, while maintaining the first predetermined time distance, changing the first predetermined time distance to a second predetermined time distance between the host vehicle and the lead vehicle in the control unit when the parameter reaches a threshold value, maintaining the second predetermined time distance between the host vehicle and the lead vehicle by acting upon at least one of the at least one acceleration device and the at least one retardation device, wherein the second predetermined time distance is longer than the first predetermined time distance;

wherein the first predetermined time distance and the second predetermined time distance are each time intervals that elapse from when the lead vehicle passes a point until the host vehicle passes the point.

2. The method according to claim 1, further comprising: continuing to evaluate the parameter; and abandoning the second predetermined time distance between the host vehicle and the lead vehicle if the parameter is above a limit value.

3. The method according to claim 1, wherein the parameter is the magnitude of the deviation of the lead vehicle from the average speed of the lead vehicle.

4. The method according to claim 1, wherein the parameter is the magnitude of the standard deviation of the lead vehicle from the average velocity of the lead vehicle.

5. A system for adaptive cruise control in a host vehicle with at least one acceleration device for accelerating the vehicle and at least one retardation device for retarding the vehicle, and wherein the system comprises:

a control unit configured for acting upon the at least one acceleration device and the at least one retardation device, a calculating unit configured for determining at least one parameter related to a lead vehicle and a distance sensor configured for determining a distance from the host vehicle to the lead vehicle;

wherein the control unit is further configured to set, without driver input, a first predetermined time distance between the host vehicle and the lead vehicle and to maintain the first predetermined time distance by acting upon the acceleration device and the retardation device;

the calculating unit is further configured to evaluate a parameter that includes one of: (1) a number of velocity deviations, above a threshold deviation value, per unit of time, of the lead vehicle from an average velocity of the lead vehicle; (2) a magnitude of deviation of a velocity of the lead vehicle from the average velocity of the lead vehicle; and (3) a magnitude of a standard deviation of the lead vehicle from the average velocity of the lead vehicle, while maintaining the first predetermined time distance, wherein the control unit is further configured to change the first predetermined time distance to a second predetermined time distance between the host vehicle and the lead vehicle when the parameter reaches a parameter threshold value, and to maintain the second predetermined time distance between the host vehicle and the lead vehicle by acting upon the at least one acceleration device and the at least one retardation device, so that the second predetermined time distance is longer than the first predetermined time distance; and the first predetermined time distance and the second predetermined time distance are each time intervals that elapse from when the lead vehicle passes a point until the host vehicle passes the point.

6. The system according to claim 5, wherein the control unit is further configured to abandon a predetermined time distance between the host vehicle and the lead vehicle if the parameter is above a limit value.

7. The system according to claim 5, wherein the distance sensor comprises a camera and/or a radar and/or a laser distance-measuring device, which is/are connected to the calculating unit and/or the control unit.

8. The system for adaptive cruise control according to claim 5 installed in the host vehicle.

9. A non-transitory automated data processer-readable computer medium product for adaptive cruise control of a host vehicle with at least one acceleration device for accelerating the host vehicle, at least one retardation device for retarding the host vehicle, and a distance sensor configured for determining a distance from the host vehicle to a lead vehicle, wherein the computer medium product comprises program code configured, when executed by a processor:

to set, without driver input, a first predetermined time distance between the host vehicle and the lead vehicle;

to maintain the first predetermined time distance by acting upon the at least one acceleration device and the at least one retardation device;

to evaluate a parameter that includes one of: (1) a number of velocity deviations, above a threshold deviation value, per unit of time, of the lead vehicle from an average velocity of the lead vehicle; (2) a magnitude of deviation of velocity of the lead vehicle from the average velocity of the lead vehicle; and (3) a magnitude of a standard deviation of the lead vehicle from the average velocity of the lead vehicle, while maintaining the first predetermined time distance, to change the first predetermined time distance to a second predetermined time distance between the host vehicle and the lead vehicle when the parameter reaches a threshold value; and to maintain the second predetermined time distance between the host vehicle and the lead vehicle by acting upon the at least one acceleration device and the at least one retardation device;

wherein the first predetermined time distance and the second predetermined time distance are each time intervals that elapse from when the lead vehicle passes a point until the host vehicle passes the point.

* * * * *